United States Patent [19]
Watkins

[11] 3,820,970
[45] June 28, 1974

[54] LESS DUSTY GRANULAR GYPSUM PRODUCT AND PROCESS

[75] Inventor: Kenneth Ray Watkins, Maywood, Ill.

[73] Assignee: United States Gypsum Company, Chicago, Ill.

[22] Filed: Dec. 27, 1972

[21] Appl. No.: 319,090

[52] U.S. Cl............ 71/1, 71/53, 71/63, 71/64 DC, 106/109, 423/555
[51] Int. Cl............................. C05d 9/02
[58] Field of Search.......... 71/1, 53, 60, 63, 64 DC; 106/109, 110; 423/555

[56] References Cited
UNITED STATES PATENTS
| | | | |
|---|---|---|---|
| 1,973,473 | 9/1934 | Edwards | 423/555 |
| 2,935,387 | 5/1960 | Phillips | 71/64 DC |
| 3,056,723 | 10/1962 | Galloway | 71/116 |
| 3,480,387 | 11/1969 | Yasutake et al. | 423/555 |
| 3,592,670 | 7/1971 | Kossuth et al. | 106/110 |

Primary Examiner—Charles N. Hart
Attorney, Agent, or Firm—Kenneth E. Roberts, Esq.; Stanton T. Hadley, Esq.; Samuel Kurlandsky, Esq.

[57] ABSTRACT

A compaction-granulation process of producing less dusty gypsum granules is disclosed. The process includes admixing calcium sulfate dihyrate with about 10–20 percent calcium sulfate hemihydrate and about 2–4 percent water to form a substantially dry solid-liquid mixture; compacting the mixture while at a pressure of about 1000–2000 psig into a sheet of compacted material; flaking the compacted material; and crushing the material to the desired granular size. The basic product may be used as a soil conditioner; and optional ingredients may be included to use the granular product as a fertilizer, plant nutrient supplement, pesticide, pharmaceutical and the like.

13 Claims, 4 Drawing Figures

PATENTED JUN 28 1974

3,820,970

LESS DUSTY GRANULAR GYPSUM PRODUCT AND PROCESS

BACKGROUND OF THE INVENTION

This invention concerns granular gypsum products; and more particularly a method for forming a granular gypsum product by pressure roll compaction-granulation which product is less dusty in comparison to prior granulated gypsum products.

Calcium sulfate dihydrate in a form frequently called agricultural gypsum, is often pelletized and the pellets applied to soil as a soil-conditioning agent. The present commercially available products are extremely dusty, that is they contain a very large proportion of fines through disintegration of the high friable product during processing, handling and application, such that the material is very awkward to work with, if not hazardous. In attempts to apply the material as a soil conditioner large quantities are lost through drifting on the wind. In fact, when application of these materials via large broadcast spinner type spreaders is observed, it appears as though a large cloud is enveloping the spreader and tractor.

Further, because of the particle size distribution in the present commercially available products, the fine materials segregate when mixed with coarser 6-by-16 mesh fertilizers.

This invention pertains to granules produced by pressure roll compaction in contrast to pellets produced by drum or disc pelletizers. In drum and disc pelletizing methods, the feed material is generally quite wet, usually consisting of about 10-20 percent or more of moisture or liquid. This high amount of moisture necessarily requires drying. In certain high priced products, such as primary and secondary fertilizers, the added cost of drying can be justified, but this has not been economical for lower priced products. Pressure roll compaction can generally utilize less moisture in the feed mixture; but the requirements for a suitable binder to hold the compressed material together and after compaction are even more stringent than in the drum or disc pelletizing method.

In both of these two methods, some sort of binder ingredient must be included, unless the primary ingredient itself has sufficient wet or "green" strength and sufficient dry strength to hold the final product together without substantial dusting and yet allow it to eventually disintegrate during weathering. Heretofore binders for such product have been characterized in either developing insufficient strength to prevent dusting or being quite costly to include in the formulation or requiring additional processing steps.

It is known to make pesticidal products by disc or drum pelletizing methods, which products may include gypsum materials primarily as a filler ingredient, as is shown in U.S. Pat. No. 3,056,723. As can be seen from this patent the moist pellets involved in pelletizing require very large quantities of water.

U.S. Pat. No. 2,935,387 discloses a compacting process for producing a granular fertilizer product. This process appears to require the inclusion of muriate of potash and brine with strict control of the temperature during the compaction step in order to bind the fertilizer granules together.

U.S. Pat. No. 1,973,473 discloses that a small amount of plaster of Paris can be mixed with a precipitated calcium sulfate in the presence of a small amount of water to aid in providing sufficient wet strength for molding or pelletizing the mixture together prior to roasting or burning the mixture into a Keene type cement. Working strength and dry strength are of no concern in this patent as the intent is to merely hold the materials together until subjected to roasting. Further, proportions of the ingredients do not appear to be critical.

SUMMARY OF THE INVENTION

It is therefore one object and advantage of the present invention to provide gypsum products in granular form, which granules are scarcely dusty in comparison to prior gypsum products.

Another object is the provision of gypsum granular products which are scarcely dusty and which are fertilizer sized and which may be applied as soil conditioning agents and the like.

A further object is the provision of less dusty granular gypsum products containing optional ingredients and which may be used as fertilizers, plant nutritional supplements, pesticides, pharmaceuticals and the like.

Another object is the provision of granular gypsum products by a process which does not involve the use of large proportions of water or other liquid and which therefore does not involve additional costly mechanical drying steps.

Still another object is the provision of a process for preparing granular gypsum products having a novel, economical binding-aid material which aids in the development of "green" strength of the mixed feed materials; "working" strength during processing of the granules; and "cured" strength after the granules have been processed and are being stored, handled or used.

A still further object is the provision of a process of making a less dusty granular gypsum product using a novel binding-aid material which acts as a "chemical drying" agent in the process.

Still another object is the provision of a process for formulating a compacted gypsum product in which the strength development agent not only acts to aid binding but also acts as a "chemical drying" agent.

The fulfillment of these and other objects and advantages of the present invention are accomplished in one preferred embodiment for the production of a scarcely dusting granular agricultural gypsum dihydrate soil conditioner, by admixing calcium sulfate dihydrate as a major ingredient with, by weight, about 10-20 percent of calcium sulfate hemihydrate and about 2-4 percent of water to form a substantially dry solid-liquid mixture; compacting the solid-liquid mixture while at pressures of about 1000-2000 pounds per square inch gauge (psig) into a sheet of compacted material; thereafter flaking the material; and finally crushing the material to the desired granular size, such as to the size of commercial fertilizer granules, i.e. about 6 by 16 U.S. Standard mesh. The hardness of the so-produced material approaches that of conventional fertilizers; and the decrease in dusting is greatly improved in comparison to other pelletized and granulated gypsum products. This appears to be accounted for by the presence, in the amounts stated, of the water and the calcium sulfate hemihydrate. Most of the binding or bonding action in the product is provided by the water, which lubricates the particles and allows for closer particle packing. While the hemihydrate contributes significantly to the strength of the granules, its major function

DESCRIPTION OF THE PREFERRED EMBODIMENTS

Figure 1:
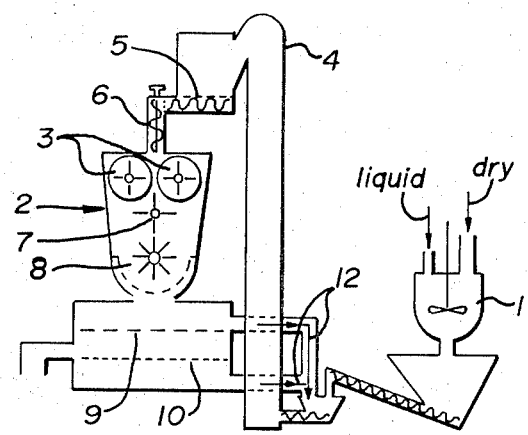
FIG. 1 is a schematic illustration of a process for producing products of the present invention.

The principal ingredient of the granule is calcium sulfate dihydrate or anhydrite or mixtures thereof, as found in the common industrial mineral known as gypsum, although gypsum derived from various sources including so-called synthetic or byproduct gypsum may be used. The gypsum dihydrate will generally be the major ingredient in most of the embodiments of products of the present invention, although this quantity may be as little as about 15 percent or less. Generally, when the final product is to be put to such end uses as a soil conditioner, animal litter and the like, the gypsum dihydrate will be present in amounts upward toard 100 percent in the final product. In alternate preferred embodiments where the final product is to be used as a fertilizer, plant nutritional supplement, animal feed, pesticide and the like the proportions should be in the general range of about 12–75 percent, although this is highly variable and amounts above and below this quantity can be used but without substantial further advantage.

In alternative preferred embodiments, the end product will be used as a complete fertilizer, plant nutritional supplement and the like. In the instances of a complete fertilizer, suitable amounts of primary plant nutrients (sources of nitrogen, phosphorus and potassium) will be admixed, preferable in dry form, with the feed materials, and preferably in amounts of about 5 to about 15 percent by weight; although considerably more or less may be used but without substantial further advantage. Secondary plant nutrients, such as magnesium and sulfur, may be incorporated in the same fashion into the feed materials in the customary amounts for their known and useful effects. Micronutrients, such as copper, zinc, boron, iron, manganese, molybdenum and the like, may be incorporated in similar fashion to supply further additional plant nutrient values to the soil. In general, the percentages of micronutrient addition will be dictated by soil analysis, and will generally vary between about 0.05 and 10 percent by weight. The granule of the invention is compatible with a great variety of biocides and pesticides; and such materials may be incorporated, preferably in dry form, with the feed materials in customary quantities for their usual and known customary effects. When a "food grade" gypsum or FDA approved calcium sulfate dihydrate is used in the granules, the resultant granular product may be used as a carrier base material for a large variety of food, cosmetic, and pharmaceutical applications.

The water present in the feed mixture is in an amount just slightly more than the stoichiometric amount needed to convert the hemihydrate in the mixture to dihydrate and to allow the hydrating hemihydrate to assist the water in binding the gypsum dihydrate while both are passing through the process. Surprisingly it has now been found that most of the binding or bonding action between the dry materials in the feed mixture is attributable to the water, which lubricates the particles and allows for closer particle packing of the gypsum dihydrate. It was previously known that water, when united with calcium sulfate dihydrate alone, acts as a good binder once the mixture has dried; however, the green strength of the mixture is very poor. It now appears that the water acts to lubricate the particles and allow for closer particle packing so as to obtain the greatest density of particle packing of feed material. The high pressure of the roll compactor contributes extensively to the strength of the resultant granular product, particularly in the working strength and the dry strength. However not all of the strength is attributable solely to the water and the compaction pressure, for the hemihydrate contributes significantly to the strength of the resultant granule, especially to the green strength and the working strength. The resultant dry cured strength appears to be substantially higher than without the required amounts of added water and hemihydrate, or with other materials substituted therefor. Generally the water is present in the substantially dry solid-liquid feed mixture in amounts of about 2–4 percent by weight of the feed mixture. The inclusion of considerably higher quantities of water would require an additional step of mechanically drying the product plus a wetter feed would tend to cause flow problems during processing. Considerably less water would not provide sufficient lubricity and particle packing of the feed materials and conversion of the hemihydrate to dihydrate to hold the feed materials together during and after compacting. This condition would result in a very dusty, friable granule.

The hemihydrate should be present in amounts generally from about 10–20 percent by weight of the feed mixture; although slightly more or less may be used but without substantial further advantage. While the calcium sulfate hemihydrate contributes significantly to strength development in the resultant granule, the major function of the hemihydrate is to chemically combine the water which was added as a compacting aid and binder, thus eliminating the need for mechanically drying the mixture during or after compaction. If substantially less than about 10 percent of the feed mixture is hemihydrate then there would not be sufficient hemihydrate to chemically dry the amount of water necessary to be present in order to sufficiently lubricate and provide particle packing for effective compaction. At present there does not appear to be any further substantial advantages obtainable by adding considerably more than 20 percent hemihydrate to the feed mixture. Further improved strengths of the granule could result if more hemihydrate is used, with the stoichiometric water equivalent being present, but the water should not exceed about 4 percent because of the flow problems presented.

In the process, as more particularly illustrated in FIG. 1, the feed materials to be compacted are fed into mixer 1, and optionally allowed to mix until homogeneity is achieved. The feed materials are then metered into a compacting machine 2 which preferably consists of counter-rotating substantially cylindrical rolls 3 which are urged toward each other under desired pressure. The feed into the rolls can be assisted by a conventional force feeder 4. In a particularly preferred embodiment, the force feeder 4 will consist of a horizontal screw 5 leading to a vertical screw 6 to additionally aerate and densify the material before forcing it into the pressure rolls 3. The rolls 3 preferably have a corrugated face pattern to provide fracture points in the resultant compacted sheet to improve ease of granulating. The pressure of the rolls is preferably about 1000 to about 2000 pounds per square inch guage (psig), the temperature being maintained generally at ambient room temperatures disregarding heat by friction. The higher pressures in this range are preferred as generally tending to increase hardness of the intermediate flake material as well as increasing throughput and output. The material fed into the area between the compactor rolls 3 is pressed to form a ribbon or sheet. The sheet or ribbon material is then fed to a flake-breaker 7, which may be of any desired construction, and which breaks the sheet material into flakes. The flakes ma vary in size, the smallest of which is roughly about ½ inch. The flakes are then fed into a granulator 8 which may be of standard construction and generally includes a corrugated roll pressing against an exit grid or one or more pairs of opposed corrugated rolls, the corrugation extending longitudinally on one roll and disposed circumferentially on the other roll, to produce a crushing action to any desired size of granules. The granules are then screened so as to separate oversized granules and undersized granules or fines, such as by a pair of screens shown in FIG. 1 as 9 and 10, having U.S. Standard mesh ratings respectively of No. 6 and No. 16. As will be appreciated, the screening is entirely optional to the desired product size of the ultimate end product. The oversized granules and fines can be returned to the mixer for recycling through the process, as by line 12.

The operational throughput speeds of the mixer, any desired force feeder, the compactors, flake breaker and granulator are of course highly variable. Time of setting of the feed mixture while it is passing through the equipment can be easily varied to suit throughput speeds by adding any one or more of the common gypsum accelerators and/or retarders. Generally it is more preferred to add a retarder, and the common retarders such as citric acid and ligno-cellulosic materials may be added in their known amounts. Generally, when the amounts of water and hemihydrate are at the upper portion of the aforementioned range, process output will increase with increasing levels of retarder but strength will also slightly decrease. At the higher levels of water and hemihydrate and with high levels of retarder added, processing cycle time and amount of recycle are generally not affected and there is a slight increase in strength of the resultant granule.

The following examples are presented for the purpose of further illustrating and disclosing the present invention, and are by way of illustration and not in limitation thereon.

EXAMPLE 1

A Chilsonator compactor and granulator machine was fed the formulations set forth in Table 1. The feed materials were added by mixing the dihydrate and hemihydrate in a mixer for approximately 5 minutes while the retarder solution of citric acid was being prepared in liquid form. The water and the liquid retarder were then added and the materials allowed to further mix for five minutes prior to compaction. The mixer charge was intermittently fed to a second hopper, not shown in the drawings, which metered the materials into the force feeder 4, which also received recycle materials from the screens 9 and 10.

From the runs set forth in Table 1 some generalizations can be made as follows. A comparison of the runs shows that the combination of hemihydrate, water and retarder significantly increased the cured strength of the product. Additions of the hemihydrate at 10 and 20 percent levels with required water did not significantly affect the output, but decreased recycling. Granule strength improved significantly with 20 percent hemihydrate and stoichiometric water to convert all of the hemihydrate to dihydrate. Adding water over the stoichiometric requirement of 3.6 percent increased the recycle and decreased the throughput, plus it was observed that at the 4 percent water level there was some material build up in the processing operation due to sticking of the material on the screens 9 and 10 and on the elevators to the force feeder.

Approximately 2 tons of the material produced in run nos. 10 and 13 were combined and spread on soil as a soil conditioner using a Calhoun brand 1,500 pound capacity spreader.

Table 1

| Run No. | 1 | 2 | 3 | 4 | 5 | 6 | 7 | 8 |
|---|---|---|---|---|---|---|---|---|
| Material Added | | | | | | | | |
| Hemihydrate | 0 | 0 | 10 | 10 | 10 | 10 | 10 | 10 |
| Water | 0 | 2 | 2 | 2 | 2 | 2.3 | 2.3 | 2.3 |
| Retarder* | 0 | 0 | 0 | 0.01 | 0.02 | 0 | 0.01 | 0.02 |
| Compaction pressure | 2200 | | 2400 | 2400 | 2400 | 2200 | 2200 | 2200 |
| Run Analysis | | | | | | | | |
| Screened at | 6×14 | Too weak during screening processing; | 6×20 | 6×20 | 6×20 | 6×20 | 6×20 | 6×20 |
| % within dimensions | 87.2 | most product | 73.4 | 71.5 | 69.7 | — | — | — |
| Calculated throughput lbs./hr. | 2690 | was lost during crushing; | 1596 | 2133 | 2355 | 2150 | 1870 | 2125 |
| Actual throughput lbs./hr. | 1030 | large recycle | 950 | 993 | 1125 | 1030 | 1500 | 1135 |
| Recycled lbs./hr. | 1590 | | 144 | 94 | 112 | 1120 | 950 | 990 |
| Strength**-gm. | 7.9 | | 6.4 | 9.1 | 10.4 | 10.2 | 9.4 | 9.6 |

Table 1 -Continued

| Run No. | 9 | 10 | 11 | 12 | 13 | 14 | 15 |
|---|---|---|---|---|---|---|---|
| Material Added | | | | | | | |
| Hemihydrate | 20 | 20 | 20 | 20 | 20 | 20 | 20 |
| Water | 3.5 | 3.5 | 3.6 | 3.94 | 3.94 | 3.94 | 3.95 |
| Retarder* | 0.02 | 0.02 | 0 | 0 | 0.02 | 0.04 | 0.02 |
| Compaction pressure | 1500 | 1000 | 2200 | 2200 | 1000 | 1500 | 2200 |
| Run Analysis | | | | | | | |
| Screened at | 6×14 | 6×14 | 6×20 | 6×14 | 6×14 | 6×14 | 6×14 |
| % within screening dimensions | 91 | — | — | 91.6 | — | — | 91.5 |
| Calculated throughput lbs./hr. | 2112 | 2362 | 2080 | 2380 | 2060 | 1543 | 2090 |
| Actual throughput lbs./hr. | 762 | 712 | 1010 | 1000 | 710 | 553 | 1060 |
| Recycled lbs./hr. | 1350 | 1650 | 246 | 1350 | 1350 | 990 | 1030 |
| Strength**-gm. | 6.7 | — | 9.6 | 6.2 | 7.0 | 5.2 | 5.9 |

Figure 2:
FIGS. 2 and 3 are top view pictoral representations of granular gypsum products.
Figure 3:

*citric acid
**Cumulative weight loss average for 30 gram sample after 16 minutes AIR-JET Durability Test During the spreading, the material was compared to a material duplicating in composition that of run no. 1 and the materials were observed for coverage on the soil; uniformity of distribution on the soil; and amount of dusting due to attrition. To aid in the observations, a black polyethylene sheet covering a 20 × 40 foot area was laid on the soil before the spreading. The spreader applied the granules at a rate of 1000 pounds per acre. Wind velocity at the time of the trail was about 15-20 miles per hour during the application of combined run nos. 10 and 13, and less than 5 miles per hour during the application of the material similar to run no. 1. After spreading it was observed that the material of run nos. 10 and 13 showed an excellent spreading pattern with very little particle breakdown. This can be clearly seen in FIGS. 2 and 3. FIG. 2 pictorially represents the granules of combined run nos. 10 and 13; while FIG. 3 illustrates the granules of comparative run no. 1 which evidenced considerable dusting and particle breakdown. There was some dust in evidence, but this may have been due to the fact that the spreader did not employ any dust collecting equipment. In any event, the dusting was considered very minor and certainly no more than produced in a comparison with conventional high grade fertilizer materials produced by more expensive processes. A screen analysis was run on samples taken from the chain conveyor of the spreader. The chain conveyor of the spreader is a particular source of attrition of fertilizer and like granules since it is moving at a high rate of speed and in a direction at right angles to falling granules being fed from the hopper. Screen analysis of the samples from run nos. 10 and 13 at the chain conveyor showed no significant breakdown; while screen analysis of samples also at the chain conveyor from the material similar to run no. 1 showed a large amount of dusting. In general the spreading characteristics of the material of runs nos. 10 and 13, even in the higher wind velocity, was drastically improved over the control material duplicating in composition that of run no. 1.

EXAMPLE 2

While no standard method of evaluation has been widely accepted to measure hardness or strength of irregularly shaped 6 × 16 mesh granules, various types of attrition and load tests were evaluated. Of those evaluated, the one that appears to be most meaningful and reproducable is an ALPINE AIR-JET Sieve Durability Test as follows. Test sample aliquots are screened through 6 mesh, 8 mesh, 12 mesh and 16 mesh sieves to provide three 10 gram fractions of the size intervals; −8 mesh; −8 + 12 mesh; and −12 + 16 mesh. The threee 10 gram fractions are then remixed to form a known size distribution; the placed into a 16 mesh sieve and subjected to sieving action under high velocity air screening at 13-inch water pressure. The turbulent, high-pressure air stream produces particle breakdown as a result of particle to particle collisions, particle impact on the wall, lid and screen; and grinding action on the screen. Weight loss is recorded after 2 minute, 4 minute and 8 minute intervals; and cumulative weight loss through the 16 mesh screen is recorded after 16 minutes total retention time.

Figure 4:
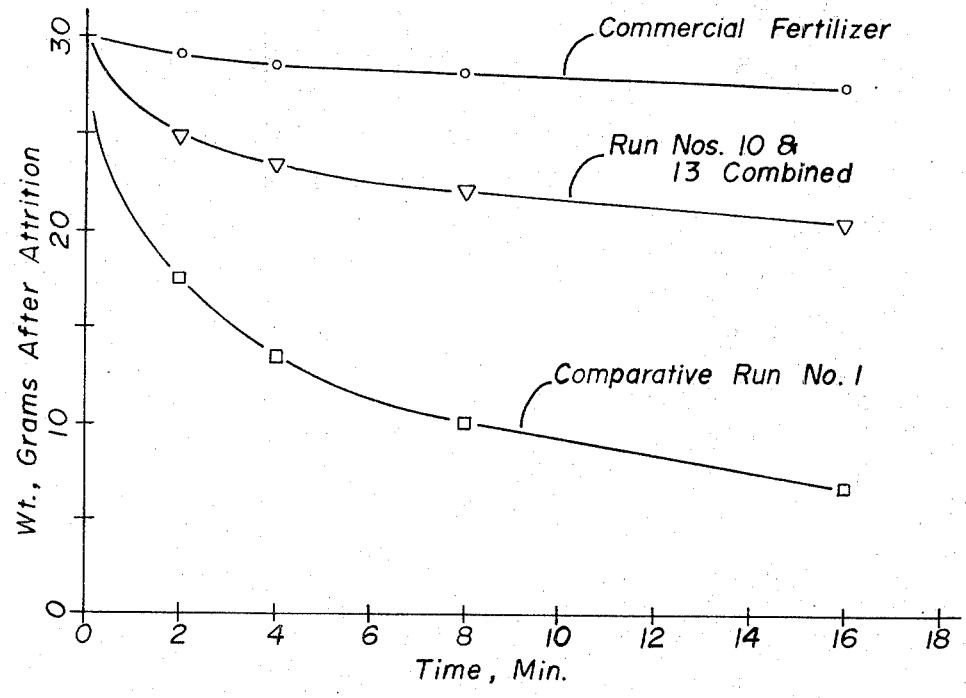
FIG. 4 is a graph illustrating comparative durability of various granular products.

Exemplary results of the Durability Test for a few of the runs of Example 1 are set forth in Table 2, along with a comparison to a high quality commercial granular fertilizer not containing soft gypsum material. Certain of the runs set forth in Table 2 are graphically reproduced in FIG. 4 and clearly show the less dusty character of the materials of the present invention, as represented by the combined materials of run nos. 10 and 13.

TABLE 2

| Material | Cumulative Weight Loss of Sample at: | | | |
|---|---|---|---|---|
| | 2 | 4 | 8 | 16 minutes |
| Run No. 1 | 2.53 gms. (8.4%) | 4.03 gms. (13.4%) | 5.75 gms. (19.2%) | 7.88 gms. (26.3%) |
| Run No. 7 | 5.13 (17.1%) | 6.43 (21.4%) | 7.8 (26%) | 9.37 (31.2%) |
| Run No. 14 | 1.55 (5.2%) | 2.55 (8.5%) | 3.75 (12.5%) | 5.2 (17.3%) |
| Commercial Fertilizer | 1.0 (3.3%) | 1.5 (5.0%) | 1.75 (5.8%) | 2.5 (8.3%) |
| Spreading Trial Combined Run Nos. 10 and 13 | 2.04 (6.8) | 3.05 (10.2) | 4.45 (14.8) | 6.0 (20) |
| Spreading Trial Control | 12.50 (41.7%) | 16.5 (55.0%) | 19.5 (63.5%) | 23.25 (77.5%) |

EXAMPLE 3

In another type of hardness test, a number of different formulations were formed into buttons of fixed dimension and subjected to a measurement of strength on a Tinius Olson Stress Strain machine.

The buttons were formed by adding a weighted quantity of the formulation to a steel cylinder with matching plunger measuring 1.50 inch in diameter. Pressure is gradually applied until 15,000 psi is attained and then rapidly released to result in a button, or disc, having an about 1.5 inch diameter and 0.25 inch thickness. The pressure for producing the buttons was approximately ten times that of the preferred compactor roll pressure. The buttons were then dried at 40°C.

For testing in the Tinius Olson machine, the individual buttons were centered on the top end of a 2-inch steel cylinder having an outside diameter of 1.59 inch and wall thickness of 0.14 inch. A plunger was attached to the pressure arm of the machine and carefully centered over the center of the button; and pressure applied to the plunger. The pressure was increased in standard increments until the buttons ruptured and then the pounds of pressure reading on the machine were taken. All buttons were run in six replications. Representative evaluations of a number of formulations are set forth in Table 3.

TABLE 3

| Material Added to Gypsum Dihydrate | % Added | Tinius Olson Strength, lbs. |
|---|---|---|
| Control | 0 | 13.5 |
| Water | 1 | 13.8 |
| Water | 2 | 39.1 |
| Water | 3 | 40.0 |
| Hemihydrate | 10 | 15.2 |
| Hemihydrate | 20 | 11.9 |
| Bentonite Clay | 2 | 11.0 |
| Attapulgite Clay | 2 | 10.4 |
| 2% concentration of polyvinyl alcohol | 1 | 16.4 |
| 2% concentration of polyvinyl acetate | 1 | 13.9 |
| Ammonium phosphate, granular | 2 | 16.4 |
| Urea | 10 | 26.2 |

From the results set forth in Table 3 it can be seen that buttons made with dihydrate and water alone showed a significant gain in strength when compared with the control and other binders. However it is noted that all these buttons were dried to remove all traces of free water prior to testing.

It is known as shown in run 2 of Example 1 that materials containing dihydrate and water alone do not possess adequate green strength and processing strength to effect good granulation efficiency, and therefore would require thorough drying for both strength and granulation efficiency before being granulated.

To evaluate this further, a number of buttons were compounded to contain about 20 percent hemihydrate, 3.9 percent water, and 0.02 percent retarder (based on the weight of the hemihydrate) added to the dihydrate. Strength evaluations on the Tinius Olson apparatus with increasing time were made as shown in Table 4. Also in another series of buttons the amounts of hemihydrate and water were varied with Tinius Olson strength evaluations being made after 1 hour of drying and when the buttons were completely dried. These results are set forth in Table 5.

TABLE 4

| Time (minutes) | 3 | 5 | 10 | 20 | 30 |
|---|---|---|---|---|---|
| Strength (lbs.) | 22.3 | — | 37.3 | 38.1 | 33.3 |
| Time | 60 | 90 | 150 | 210 | 270 |
| Strength | 44.7 | 46.3 | 48.3 | 42.2 | 47.3 |

TABLE 5

| Run No. | % Hemihydrate | % Water | % Retarder | 1 hour Strength | Cured Strength |
|---|---|---|---|---|---|
| 15 (control) | 0 | 0 | 0 | 13.5 | 13.5* |
| 16 | 0 | 2 | 0 | 12.9 | 56.0 |
| 17 | 0 | 4 | 0 | 10.8 | 52.3 |
| 18 | 10 | 2 | .025 | 25.7 | 54.0 |
| 19 | 20 | 2 | .025 | 35.9 | 52.3 |
| 20 | 10 | 2 | .050 | 29.6 | 55.7 |
| 21 | 20 | 2 | .050 | 31.8 | 46.0 |
| 22 | 10 | 4 | .025 | 22.5 | 53.1 |
| 23 | 20 | 4 | .025 | 34.8 | 62.8 |
| 24 | 10 | 4 | .050 | 23.0 | 60.1 |
| 25 | 20 | 4 | .050 | 40.7 | 53.6 |

From Tables 3, 4 and 5 it can be seen that buttons containing water had strength far exceeding that of the control as to completely dry cured strength; but additions of hemihydrate, water and optional retarder developed strength during the periods necessary for processing the materials from the mixer through the compactor i.e. green and working strength.

EXAMPLE 4 specific preferred soil conditioning products can be made according to the process of this invention using the following formulations. The resultant granular products are scarcely dusting when applied to the soil with broadcast spinner spreaders.

| Fertilizer | Plant Supplement |
|---|---|
| percent | percent |
| 73 gypsum dihydrate | 75.9 gypsum dihydrate |
| 10 gypsum hemihydrate | 20 gypsum hemihydrate |
| 15 ammonium phosphates | 0.08 copper |
| 2 water | 0.02 citric acid retarder |
|  | 4 water |
| 100% by weight | 100% by weight |

| Herbicide |
|---|
| percent |
| 61.4 gypsum dihydrate |
| 20 gypsum hemihydrate |
| 15 2-(4-chloro-6-ethylamino-5-triazin-2-ylamino)-2-methylpropionate herbicide |
| 3.6 water |
| 100% by weight |

Optionally about 3–20 percent by weight of a water-swelling clay may be added to any of the above formulations to aid in weathering of the granule. For example about 5 percent of Volclay brand of bentonite clay may be added, with a corresponding 5 percent decrease in the amount of gypsum dihydrate. This swelling clay expands or exfoliates when it gets wet, thus helping break down the granule through weathering for absorption into the soil.

While the present invention has been described and exemplified with respect to certain embodiments, it is not to be considered limited thereto; and it is understood that variations and modifications thereof, obvious to those skilled in the art, may be made without departing from the spirit or scope of this invention.

What is claimed is:

1. A method of producing a hard, scarcely dusting, gypsum dihydrate granule which includes the steps of:
   1. admixing calcium sulfate dihydrate as a major ingredient with, by weight, about 10–20 percent of calcium sulfate hemihydrate and about 2–4 percent of water to form a substantially dry, solid-liquid mixture;
   2. compacting said solid-liquid mixture while at pressures of about 1000–2000 psig into a sheet of compacted material; and
   3. crushing the material to the desired granule size.

2. The method of claim 1 including the step of breaking the sheet of compacted material into coarse flakes before crushing to desired granule size.

3. The method of claim 1, for producing a soil conditioning material, including the step of crushing the material to approximately 6 by 16 mesh granules.

4. The method of claim 1, for producing fertilizer material, including the step of adding a material selected from the group consisting of:
   about 5 to 15 percent of primary plant nutrients;
   about 1 to 5 percent of secondary plant nutrients; and
   about 0.5 to 5 percent micronutrients.

5. The method of claim 1, for producing a pesticidal material, which includes the step of adding a pesticidally effective amount of a pesticidally active material.

6. The method of claim 1 including the step of adding about 0.02 – 0.05 percent by weight of a gypsum retarder to the mixture.

7. The method of producing a hard, scarcely dusting, granular pesticide which includes the steps of admixing calcium sulfate dihydrate as a major ingredient with about, by weight, 10–20 percent of calcium sulfate hemihydrate, about 2–4 percent of water and a minor amount of 2-(4-chloro-6-ethylamino-2-triazin-2-ylamino)-2-methylpropionitrile to form a substantially dry, solid-liquid mixture; compacting said solid-liquid mixture while at pressures of about 1000–2000 psig into a sheet of compacted material; thereafter flaking the material; and finally crushing the material to the desired granular size.

8. A feed mixture for a hard, scarcely dusting, fertilizer sized, granular gypsum product for being compacted under pressures of about 1000–2000 psig into a sheet, and flaked and crushed into fertilizer sized granules; comprising a mixture of calcium sulfate dihydrate as a major ingredient, about 10–20 percent of calcium sulfate hemihydrate, and about 2–4 percent of water.

9. The feed mixture of claim 8 including about 0.02–0.05 percent of a retarder.

10. The feed mixture of claim 8 in which the hemihydrate is present in an amount of about 10 percent by weight; the water is present in an amount of about 2.3 percent by weight; and including about 0.01 percent by weight of citric acid retarder.

11. The feed mixture of claim 8 including a fertilizer ingredient.

12. The feed mixture of claim 8 including a pesticide.

13. A method of producing a hard gypsum dihydrate granule which is resistant of dusting, comprising the steps of:
   1. Admixing calcium sulfate dihydrate as a major ingredient with, by weight, about 10–20 percent of calcium sulfate hemihydrate and about 2–4 percent of water to form a substantially dry, solid liquid mixture;
   2. Forming said solid liquid mixture into a sheet of compacted material, by compaction at pressures of from about 1000 to about 2000 psig; and
   3. Crushing the compacted material to the desired granule size.

* * * * *